United States Patent [19]

Goldstein et al.

[11] 4,434,370
[45] Feb. 28, 1984

[54] SELF-POWERED RADIATION DETECTOR WITH IMPROVED EMITTER

[75] Inventors: Norman P. Goldstein, Murrysville, Pa.; William H. Todt, Elmira Heights, N.Y.

[73] Assignee: Westinghouse Electric Corp., Pittsburgh, Pa.

[21] Appl. No.: 213,691

[22] Filed: Dec. 4, 1980

[51] Int. Cl.³ .............................................. G01T 1/22
[52] U.S. Cl. .................................................... 250/370
[58] Field of Search ............................... 250/370, 390

[56] References Cited

U.S. PATENT DOCUMENTS

| | | |
|---|---|---|
| 2,462,471 | 2/1949 | Crumrine . |
| 3,892,969 | 7/1975 | Warren .......................... 250/390 |
| 3,904,881 | 9/1975 | Klar et al. ..................... 250/390 |
| 4,080,533 | 3/1978 | Todt ............................. 250/390 X |
| 4,091,288 | 5/1978 | Levert et al. .................. 250/370 |

*Primary Examiner*—Davis L. Willis
*Attorney, Agent, or Firm*—W. G. Sutcliff

[57] ABSTRACT

A self-powered nuclear radiation detector with an emitter electrode of an alloy of a first major constituent metal having a desired high radiation response, and a second minor constituent which imparts to the alloy a desired thermal or mechanical characteristic without diminishing the desired high radiation response. A gamma responsive self-powered detector is detailed which has an emitter with lead as the major constituent, with the minor constitutent selected from aluminum, copper, nickel, platinum, or zinc.

3 Claims, 1 Drawing Figure

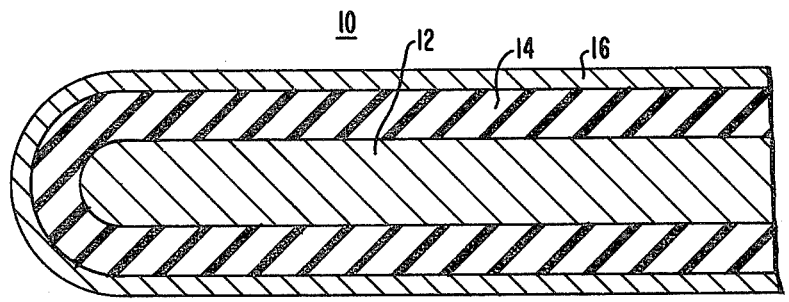

SELF-POWERED RADIATION DETECTOR WITH IMPROVED EMITTER

BACKGROUND OF THE INVENTION

The present invention relates to self-powered radiation detectors which are typically utilized for in-core nuclear reactor radiation monitoring. The conventional self-powered radiation detector utilizes a central emitter wire, insulating means about the emitter wire, and a coaxially disposed collector sheath about the insulating means. The term "self-powered" relates to the fact that no drive potential is applied across the detector electrodes, but rather a signal current is generated as a function of the radiation response characteristic of the materials which are used for the emitter and collector electrodes. In general, the collector electrode is fabricated of a low neutron cross section, high temperature resistant, non-reactive material, such as the nickel-alloy Inconel, which is a trademarked material of the International Nickel Co. The emitter material is generally selected as the more radiation interactive material, and can be selected to be neutron responsive or gamma responsive based on the application and type of nuclear reactor.

The selection of emitter materials for such self-powered radiation detectors which are to be used in the core of a nuclear reactor must meet both mechanical and nuclear reaction considerations. Some of the properties which are desirable are good ductility, high melting temperature, desirable neutron cross section and/or gamma ray interaction probability. The fact that both mechanical and nuclear properties are to be satisfied tends to narrow the choice of materials to be used as the emitter in a self-powered detector. Some of the more widely used materials are rhodium and cobalt for neutron responsive detectors, and platinum for gamma ray responsive detectors. A metal which has a very desirable radiation response is lead, which has an almost pure gamma response, but has not found use for in-core application because of the low melting point of lead.

In a heavy nuclear reactor, such as the Canadian Candu reactor, the neutron flux and ratio of neutron to gamma radiation, is many times higher than for light water reactors of the pressurized water reactor type. This high neutron flux produces excessive burn-up of the neutron responsive material in self-powered detectors. The term burn-up refers to the atomic conversion of the material from a neutron interactive state to a relatively noninteractivity state. Currently, a widely used self-powered detector for such heavy water reactors utilizes a platinum emitter which is responsive to both neutron and gamma radiation. Such a platinum emitter self-powered detector produces a mixed response which is the sum of both the neutron interaction and gamma response of the material. Because of the high neutron flux and the burn-up of the neutron interactive component, the signal response will vary markedly with time. A more inherent problem is due to the difficulty of interpreting the generated signal due to the fact that it is a sum of a response to both neutron and gamma radiation.

It is therefore generally desirable to produce a self-powered detector which has a pure gamma response. A prior art attempt to produce a pure gamma response device utilized a nickel alloy steel such as Inconel as the emitter with platinum cladding about the Inconel emitter. This configuration lowers the neutron response from the platinum without significantly affecting the gamma response. This clad design still produces a mixed response although shifting it to be more gamma responsive than neutron responsive.

SUMMARY OF THE INVENTION

An improved self-powered nuclear radiation detector which is suitable for high temperature in-core usage in provided by forming the emitter of the detector of an alloy of a first metal as a major constituent which exhibits high radiation response, with a minor portion of at least one other alloying metal having a low neutron cross section and a desirable mechanical or thermal characteristic. The resulting alloy exhibits the desired mechanical or thermal characteristic, such as a melting point of greater than about 700° C., while retaining the high radiation response of the major constituent.

More particularly, a superior pure gamma responsive self-powered radiation detector is provided by an emitter formed of an alloy of lead as the major constituent, with a sufficient atoms percent addition of at least one of the group of aluminum, copper and nickel, so as to form an alloy with a melting point of greater than about 700° C., which alloy retains the superior gamma response, high density and ductility of the major constituent lead.

BRIEF DESCRIPTION OF THE DRAWINGS

The sole FIGURE is a side elevational view in section of a self-powered detector of the present invention.

DESCRIPTION OF THE PREFERRED EMBODIMENTS

The self-powered detector 10 seen in the sole FIGURE comprises a centralized emitter wire 12, insulating means 14 about the emitter wire 12, and a conductive collector electrode or sheath 16 coaxial about the insulating means. A prior art gamma responsive self-powered detector is seen in U.S. Pat. No. 4,080,533.

In the present invention the collector electrode is typically a nickel alloy such as Inconel, and the insulating means is typically highly compacted aluminum oxide. The emitter wire 12 is preferably a lead alloy in which lead is the major constituent typically being at least 90 atom percent of the alloy or greater. The alloy further includes a sufficient atom percent of at least one of the group of aluminum copper and nickel. These minor constituent alloy portions are present in an amount sufficient to form an alloy with a melting point of greater than about 700° C., which alloy retains the superior gamma response, high density, ductility, and low neutron response of the major constituent lead.

Lead is an almost ideal emitter material for gamma sensitive self-powered detectors since it has a high atomic number of 82, a high density of 11.25 grams per cubic centimeter, and a low neutron cross section of 0.2 barns. The only reason that lead has not been heretofore utilized in self-powered detectors is its relatively low melting point of about 300° C., which has negated the use of a lead emitter self-powered detector for use inside the core of a nuclear reactor.

The present invention teaches that a self-powered detector using the lead alloys described herein produces a lead alloy emitter self-powered detector with an acceptably high enough melting point, and without altering the desirable nuclear properties of the lead major constituent of the alloy. The functional aspects which are sought for the desired emitter alloy are a high gamma response, a high melting point greater than about 700° C., a low neutron cross section, a high density, and good ductility for ease of fabrication of the detector device. The minor constituent alloying metals, aluminum, copper and nickel, have relatively low neutron cross sections. When alloyed with lead in small amounts, these minor constituent metals will raise the alloy melting point to greater than about 700° C. while retaining the desirable gamma response characteristic of the lead for the device. By way of example, a lead-aluminum alloy which is 98 atom percent lead and 2 atom percent aluminum has a melting point of about 700° C., while a lead-aluminum alloy of 97 atom percent lead and about 3 atom percent aluminum has a melting point of about 800° C. For a lead-copper emitter alloy the 700° C. melting point can be achieved with about 95 atom percent lead and 5 atom percent copper. The addition of these relatively small atom percentages of minor constituent alloying metals such as aluminum, copper and nickel does not significantly reduce the density of the alloy. For lead alloys of either lead-aluminum, lead-copper or lead-nickel, the density of the alloy remains above about 11 grams per cubic centimeter when lead constituents at least 90 atom percent of the alloy.

The detector of the present invention with the lead alloy emitter and an Inconel sheath still has a neutron response because of the neutron ineractions in the Inconel sheath. The sheath or collector electrode is not as efficient at producing signal current as the gamma responsive emitter, so that the overall effect of the neutron interactions in the collector give rise to a device in which the gamma response represents about 80 percent of the total signal current produced by the detector in a heavy water reactor. However, the burn-up rate of the detector will be considerably reduced. This reduced burn-up rate means the device can be operated at a relatively constant response rate for a longer period of time without replacement.

If it is further desired to reduce the neutron response for the essentially gamma responsive self-powered detector of the present invention, the Inconel collector sheath can be replaced with a collector material such as zirconium, which has a very low neutron cross section.

While the invention has been described by reference to a lead alloy emitter which is gamma responsive, yet has a high melting point, it is not limited thereto. A variety of emitter metal alloys can be formed which retain the desired high radiation response characteristic of a first major constituent, with the mechanical or thermal characteristic of the alloy being an improvement over the first major constituent characteristics by virtue of the second minor constituent inclusion. Thus, while the first major constituent has an adverse mechanical or thermal property such as having a low melting point, excessive brittleness, being too soft, the second minor constituent can render the alloy usable for reactor applications by eliminating or minimizing the adverse mechanical or thermal property. The second minor constituent is selected so that the alloy retains the desired high radiation response characteristic of the first major constituent.

The metal rhodium has been used as an emitter due to a high neutron response, but rhodium is quite brittle and difficult to fabricate in a self-powered detector. By alloying rhodium with up to about 5 atom percent of platinum, copper, or silver, the alloy will exhibit greatly improved ductility for fabrication ease, while still retaining the desirable high neutron response characteristic of the rhodium.

We claim:

1. A gamma responsive self-powered radiation detector which comprises an elongated center wire emitter, insulating means about the emitter wire, and a collector electrode coaxial about the emitter and insulating means, which emitter wire is an alloy of lead as the major constituent with a sufficient atom percent addition of one of the group of aluminum, copper, nickel, platinum, or zinc so as to form an alloy with a melting point significantly greater than that of lead, which alloy retains the superior gamma response, high density and ductility of the lead major constituent.

2. The gamma responsive self-powered radiation detector set forth in claim 1, wherein the alloy consists of a lead-aluminum alloy which is at least about 98 atom percent lead and the remainder aluminum.

3. The gamma responsive self-powered radiation detector set forth in claim 1, wherein the lead major constituent constitutes 90 atom percent or greater of the alloy.

* * * * *